UNITED STATES PATENT OFFICE.

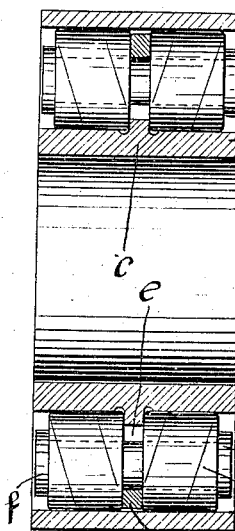
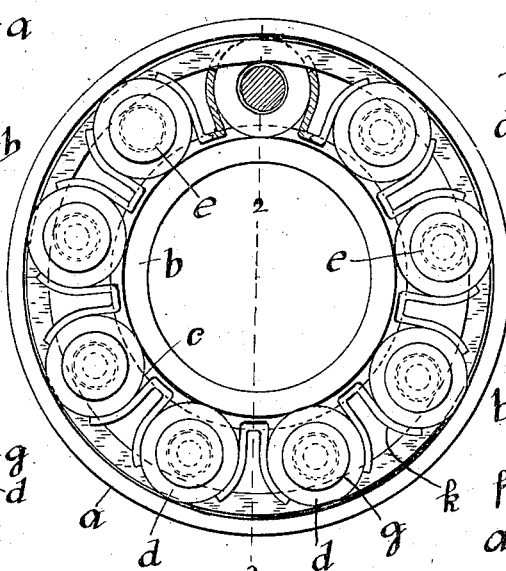
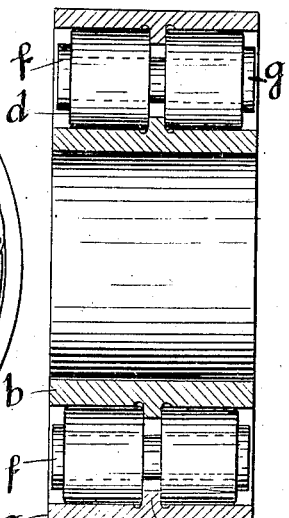
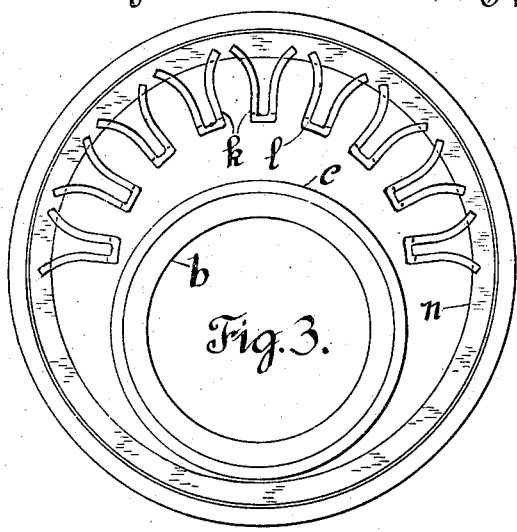
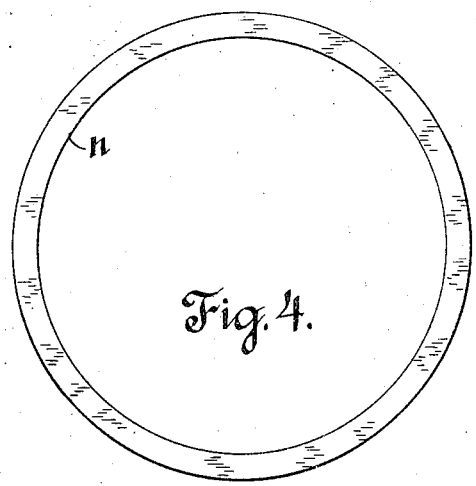
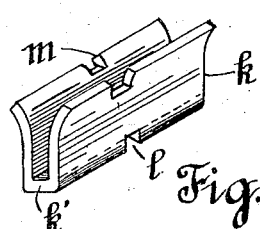

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH ROLL-SEPARATORS.

1,080,288.     Specification of Letters Patent.     Patented Dec. 2, 1913.

Application filed May 23, 1912, Serial No. 699,101. Renewed October 24, 1913. Serial No. 797,098.

*To all whom it may concern:*

Be it known that I, CHARLES S. LOCKWOOD, residing at 289 Market street, Newark, county of Essex, and State of New Jersey, have invented certain new and useful Improvements in Roller-Bearings with Roll-Separators, fully described and represented in the following specification and the accompanying drawings, forming a part of the same.

The present invention relates to roller bearings having a cylindrical hub and casing with a rib upon one or both of these elements, and duplex rolls having each two sections fitted to the hub at opposite sides of the rib.

In the present invention, the roll-sections are carried upon pins with heads at their opposite ends which hold the sections of each roll contiguous to the rib so that the rib prevents end movement upon the hub.

The invention consists of a particular construction for the hub, the casing, the rolls, and spacers for the rolls upon the hub, consisting of separate U-shaped sheet-metal separators fitted between the rolls, and preferably formed of elastic metal so as to contact elastically with the rolls and hold them from lost motion in the casing.

The rolls may be made integral with the pin or spindle if the casing be made cylindrical from end to end, as such rolls can be assembled upon the hub with the separators, and the casing then slipped over the whole. A ring is preferably fitted between the roll-sections adjacent to the casing, and may be made integral with the casing or separate therefrom. The separators are notched transversely to fit the rib upon the hub and the ring next the casing, such rib and ring serving to guide the rolls and separators in their movements, and a loose ring, if one be used, serving to hold the assembled rolls and separators upon the hub before the casing is applied. Where the ring is made integral with the casing, the roll-sections are fitted loosely upon a pin or spindle having a head upon one end only, and an additional head or collar secured upon the other end after the roll-sections are applied to the hub and casing at opposite sides of the rib. In such construction, the separators can only be applied to the rib and ring by proportioning the hub and the ring so that the hub can be pushed to one side of the ring and leave sufficient space at the opposite side to insert all the separators in a group. The hub can then be moved to the center of the ring and the separators shifted to their permanent positions, with equal spaces between them in which the rolls may then be inserted.

The improvements will be understood by reference to the annexed drawing, in which—

Figure 1 is an end view of a bearing having the rolls and separators encircled in a loose ring; Fig. 2 is a section on line 2—2 in Fig. 1; Fig. 3 shows the means of inserting the separators between the ring and hub; Fig. 4 is a side view and Fig. 5 an edge view of the ring detached; Fig. 6 is a perspective view of one of the separators; Fig. 7 is an elevation of one of the duplex rolls complete; Fig. 8 is an elevation of the pin for such duplex rolls; Fig. 9 is a separate head for such pin with shank for attaching it; and Fig. 10 is a section, like Fig. 2, but the ring shown integral with the casing.

In Figs. 1 to 9, *a* designates the casing, *b* the hub, *c* an integral ring upon the hub at the middle of its length, and *d* the roll-sections fitted to the hub at opposite sides of the rib. *e* designates the pin to which the roll-sections are fitted, having an integral head at one end and at the other end a separate head *g* with shank *h* forced tightly into a hole *i* at the opposite end of the pin. This construction for the rolls is not intended to resist end thrust but to hold the rolls in place upon the hub within the bearing. The length over both ends of the pin is nearly the same as the length of the hub and casing, and the construction thus holds the duplex rolls central upon the hub. A loose ring *n* is shown fitted between the roll-sections in contact with the series of pins *e* and in close proximity to the casing *a*.

Sheet-metal separators to guide the rolls are formed as U-shaped members, the loop or bottom *k'* of the separator being fitted to move upon the hub and having at its opposite edges wings *k* projected outwardly and curved to contact with the outer sides of the rolls. The loop of the separator is formed with a notch *l* to fit the rib upon the hub, and the wings of the separator being formed with the notch *m* to fit the loose ring *n*. The separators are thus materially deeper than the space between the hub and the interior of the ring *n* and cannot be introduced longitudinally into the bearing with the hub in place; but the hub is proportioned, as shown in Fig. 3, so that when pushed to one side of the ring there is sufficient space to insert the group of separators shown in Fig. 3, all in contact with one side of the ring at one side of the hub. When the hub is pushed to its central position, as shown in Fig. 1, the separators are then slid to the position shown in that figure, and each of the pins $e$ with one of the roll-sections thereon is inserted between two of the separators, and the other roll-section and the head $g$ then applied to the pin at the opposite side of the rib $c$. The shank $h$ of the pin-head $g$ is made to fit with sufficient tightness in the hole in the pin to hold the roll-sections securely together upon the pin in the normal operation of the bearing.

With the modification shown in Fig. 10, the ring between the roll-sections is shown at $n'$ integral with the casing. It will be observed in Figs. 1 and 6, that each separator has a flat base $k'$ in which the transverse notch $l$ is formed which engages the rib $c$ across the entire width of such base, and the wings of the separator contact with the rolls at some distance above such base, so that they are capable of yielding elastically if the metal be made of suitable thickness.

It is common to use separators between rolls in the roller bearing, but my construction differs from others in the U-shape of the separators by which each of them is provided with a foot to move upon the hub and with two wings extended outwardly from the foot to embrace the outer sides of the rolls and are, in practice, made with a sufficient degree of flexibility to exert a slight elastic pressure upon the rolls. Above their point of contact, the wings are curved to fit the sides of the rolls thus forming a very large wearing surface. By making the separator wings elastic, a closer contact with the rolls can be permitted than if they were made of rigid material, and such close fitting can be secured without the accurate workmanship which is required if a rigid guide be fitted to a rigid roll. The construction thus furnishes an efficient guide for the rolls at a low cost, and avoids the entire expense of providing a cage to embrace the rolls and guide them in their movements. The construction of the duplex rolls with separate sections connected together by a central pin enables the rolls to be assembled upon a ribbed hub within an outer ring, which could not be done if the roll-sections were integral with the pin.

Having thus set forth the nature of the said invention what is claimed herein is:

1. In a roller bearing, the combination, with a cylindrical casing and a cylindrical hub having a guide-rib thereon, of a series of duplex rolls having roll-sections fitted to the hub at opposite sides of the rib, and a series of U-shaped sheet-metal separators having each a foot adapted to move upon the hub and notched to engage the rib, and having elastic wings extended outwardly from its opposite edges and curved to fit the outer sides of the rolls.

2. In a roller bearing, the combination, with the cylindrical casing and a cylindrical hub. having a guide-rib thereon, of a series of duplex rolls consisting each of a pin with heads and roll-sections fitted to the hub at opposite sides of the ribs and a series of U-shaped separators, having each a foot adapted to move upon the hub and notched to engage the rib, and having elastic wings extended outwardly from its opposite edges and curved to fit the outer sides of the rolls.

3. In a roller bearing, the combination, with a cylindrical casing and a cylindrical hub having a guide-rib thereon, of a series of duplex rolls having roll-sections fitted to the hubs at opposite sides of the rib, a ring fitted between the roll-sections next the casing and a series of U-shaped sheet-metal separators notched to engage the rib and ring and fitted between the rolls, as and for the purpose set forth.

4. In a roller bearing, the combination, with a cylindrical casing and a cylindrical hub having a guide-rib thereon, of a series of duplex rolls having roll-sections fitted to the hubs at opposite sides of the rib, a loose ring fitted between the roll-sections adjacent to the casing and a series of U-shaped separators notched to engage the rib and the loose ring and fitted between the rolls, the separators being adapted for insertion within the ring in a group at one side of the ring and hub and subsequent shifting to their operative positions.

In testimony whereof I have hereunto set my hand in the presence of two subscribing witnesses.

CHARLES S. LOCKWOOD.

Witnesses:
G. C. STULTS,
E. WILLIAMS.